(12) United States Patent
Shin et al.

(10) Patent No.: US 6,462,801 B2
(45) Date of Patent: Oct. 8, 2002

(54) LIQUID CRYSTAL DISPLAY HAVING SPLIT GATE LINES

(75) Inventors: Jae Hak Shin, Ich'on; Gyo Un Choi, Seoul, both of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

(21) Appl. No.: 09/851,016

(22) Filed: May 8, 2001

(65) Prior Publication Data

US 2001/0019383 A1 Sep. 6, 2001

Related U.S. Application Data

(62) Division of application No. 09/217,350, filed on Dec. 21, 1998, now Pat. No. 6,259,504.

(30) Foreign Application Priority Data

Dec. 22, 1997 (KR) .............................................. 97-71857
Dec. 29, 1997 (KR) .............................................. 97-76725
Dec. 29, 1997 (KR) .............................................. 97-76726

(51) Int. Cl.[7] ...................... G02F 1/1343; G02F 1/1335
(52) U.S. Cl. ........................ 349/144; 349/106; 349/108
(58) Field of Search ............................. 349/144, 106, 349/108, 109; 345/89, 149

(56) References Cited

U.S. PATENT DOCUMENTS 4,812,017 A * 3/1989 Piper ........................... 350/333
4,969,718 A * 11/1990 Noguchi et al. ............. 350/339
5,317,437 A * 5/1994 Katakura ....................... 359/87
5,485,293 A * 1/1996 Robinder ....................... 359/59
5,530,570 A * 6/1996 Terumatsu ..................... 345/89
5,606,437 A * 2/1997 Mosier ......................... 349/106
5,751,272 A * 5/1998 Silverbrook et al. ........ 345/149
5,899,550 A * 5/1999 Masaki ......................... 349/109

FOREIGN PATENT DOCUMENTS

JP        11-3379-11      * 12/1999

* cited by examiner

Primary Examiner—William L. Sikes
Assistant Examiner—Tarifur R. Chowdhury
(74) Attorney, Agent, or Firm—Ladas & Parry

(57) ABSTRACT

A liquid crystal display, comprising: a plurality of gate lines being spaced in a selected distance; a plurality of data lines being spaced in a selected distance, the data lines where a data line driving signal is provided being crossed with the gate lines to define a plurality of R, G and B pixel regions, each of data lines being split into a pair of data lines; a plurality of R, G and B dots disposed in the R, G, and B pixel regions, respectively; and a plurality of switching devices disposed in the R, G, B pixel regions, each being connected to corresponding gate line and data line of a plurality of gate lines and data lines; wherein by the split data lines, each of the R, G and B pixel regions is divided into a plurality of R, G and B sub pixel regions; and each of the R, G and B dots includes a plurality of R, G and B subdots, each of R, G and B subdots being disposed in each of R, G and B sub pixel regions, respectively.

29 Claims, 5 Drawing Sheets

LIQUID CRYSTAL DISPLAY HAVING SPLIT GATE LINES

REFERENCE TO RELATED APPLICATIONS

This application is a division of U.S. Ser. No. 09/217,350, filed on Dec. 21, 1998, now U.S. Pat. No. 6,259,504, issued on Jul. 10, 2001, which U.S. patent is hereby incorporated herein by reference.

BACKGROUND OF THE INVENTION

This invention relates to a liquid crystal display (LCD), and more particularly to a pixel arrangement structure being capable of graphic display with an oblique line.

Typically, the LCD includes a color filter substrate expressing colors according to the subtractive mixture of RGB, a thin film transistor (TFT) substrate for controlling pixels and a liquid crystals (LCs) injected between the TFT substrate and the color filter substrate. There are typically a triangle arrangement, a stripe arrangement and a mosaic arrangement as a pixel arrangement method. The stripe type pixel arrangement method as shown in FIG. 1 is mainly used for OA. Referring to FIG. 1, the prior LCD having a stripe type pixel arrangement, includes a plurality of gate lines G11, G12, G13, . . . and a plurality of data lines D11, D12, D13, . . . . The gate lines are elongated in the first direction which is a row direction and are spaced in a predetermined distance to isolate each other. The data lines are elongated in the second direction which is a column direction and are spaced in a predetermined distance to isolate each other.

The gate lines and the data lines are crosses each other to define pixel regions PS11–PS13. R, G, and B dots are respectively disposed in the pixel regions PS11–PS13, thereby constituting one pixel. In each of the pixel regions PS11–PS13, thin film transistors (TFTs) each of which its gate is connected to the corresponding gate line and its source or drain is connected to the corresponding data line, are respectively disposed at an intersections of the gate lines and the date lines. Accordingly, R, G and B dots RD, GD and BD are respectively disposed in the pixel regions PS11–PS13 and the TFTs T11–T13 for driving the R, G and B dots RD, GD and BD are respectively disposed in the pixel region. In pixel arrangement of FIG. 1, a red dot R, a green dot G and a blue dot B constituting one pixel are vertically arranged with a vertical stripe type. That is, each of R, G and B dots RD, GD and BD is straight arranged in the column direction which is a first direction along the data line. 1o which is a first direction. The LCD with a stripe type pixel arrangement is suitable for OA, not for A/V as compared with a triangle type pixel arrangement due to the poor color expression characteristics.

A triangle type pixel arrangement having the good color expression characteristics used in LCDs is shown in FIG. 2. The prior LCD having a triangle type pixel arrangement, includes a plurality of gate lines G21, G22, G23, . . . and a plurality of data lines D21, D22, D23 . . . . The gate lines are elongated in the first direction which is a row direction and are spaced in a predetermined distance to isolate each other. The data lines are elongated with a zig-zag type in the second direction which is a column direction and are spaced in a predetermined distance to isolate each other. The gate lines and the data lines are crosses each other to define pixel regions PS21–PS23. R, G, and B dots are respectively disposed in the pixel regions PS11–PS13 with a triangle arrangement, thereby constituting one pixel. In each of the pixel regions PS21–PS23, thin film transistors (TFTs) each of which its gate is connected to the corresponding gate line and its source or drain is connected to the corresponding data line, are respectively disposed at an intersections of the gate lines and the date lines. Accordingly, R, G and B dots RD, GD and BD are respectively disposed in the pixel regions PS21–PS23 and the TFTs T21–T23 for driving the R, G and B dots RD, GD and BD are respectively disposed in the pixel region, in like manner as shown in FIG. 1. In pixel arrangement of FIG. 2, R, G and B dots constituting one pixel are arranged with a triangle arrangement.

The LCDs with a triangular arrangement of FIG. 1 has a excellent color expression characteristics as compared with the LCDs with a stripe arrangement of FIG. 2. However, because the data lines are arranged with a zig-zag form, the lengths of the data line become long and the resistances of the data lines become large, as compared with the data lines of the LCDs of FIG. 1. Furthermore, the open fail becomes increased in the data lines due to a zig-zag arrangement.

SUMMARY OF THE INVENTION

An object of the present invention is to provide a LCD having a redundancy against an open fail in data lines.

An another object of the present invention is to provide a LCD having a redundancy against an open fail in gate lines.

An another object of the present invention is to provide a LCD with a triangular arrangement having an excellent color expression characteristics and being capable of an oblique type graphic display.

A still another object of the present invention is to provide a LCD with a mosaic arrangement having an excellent color expression characteristics and being capable of an oblique type graphic display.

According to an aspect of the present invention, there is provided a liquid crystal display, comprising: a liquid crystal display, comprising: a plurality of gate lines being spaced in a selected distance; a plurality of data lines being spaced in a selected distance, the data lines where a data line driving signal is provided being crossed with the gate lines to define a plurality of R, G and B pixel regions, each of data lines being split into a pair of data lines; a plurality of R, G and B dots disposed in the R, G, and B pixel regions, respectively; and a plurality of switching devices disposed in the R, G, B pixel regions, each being connected to corresponding gate line and data line of a plurality of gate lines and data lines;

Wherein by the split data lines, each of the R, G and B pixel regions is divided into a plurality of R, G and B sub pixel regions; and each of the R, G and B dots includes a plurality of R, G and B subdots, each of R, G and B subdots being disposed in each of R, G and B sub pixel regions, respectively.

In accordance with an embodiment of the present invention, each of the R, G and B dots is comprised of a pair of the R, G and B subdots and each of the R, G and B pixel regions is divided into a pair of the R, G and B subpixel regions and first R, G and B subdots of the pair of R, G and B subdots are disposed to correspond to a first data line of the split data lines and second R, G and B subdot of the pair of R, G and subdots are disposed to correspond to a second data line of the split data lines. The R, G and B pixel regions of the plurality of R, G, B pixel regions in adjacent gate lines are left-shifted or right-shifted by one subpixel region along the gate line respectively and the R, G and B dots which are disposed in the R, G are left-shifted or right-shifted by one subdot along the gate line respectively, thereby being arranged with a triangle form.

In accordance with an embodiment of the present invention, when each of R, G and B pixel regions is split into the pair of R, G and B subpixel regions by the pair of data lines, each of the R, G and B pixel regions which are defined by the odd gate lines is divided by the second data line of the split data lines and each of the R, G, B pixel regions which are defined by the even gate lines is divided by the first data line. The pair of the split data lines are arranged in parallel with each other and are simultaneously driven by the same data line driving signal. The R, G and B dots are disposed in the R, G and B subpixel regions with a zig-zag form along the data lines and the first R, G and B subdots of the R, G, B dots are disposed in the first R, G and B sub pixel regions of the R, G, B pixel regions which are formed by the odd lines of the plurality of the gate lines and the first data line of the split data lines and the second R, G and B subdots of the R, G, B dots are disposed in the second R, G and B sub pixel regions of the R, G, B pixel regions which are formed by the even lines of the plurality of the gate lines and the second data line of the split data lines, thereby being are overlapped with the first R, G and B subdots.

In accordance with an embodiment of the present invention, two switching device are disposed at every one of the R, G and B dots to drive the pair of R, G and B subdots, respectively. Of the two switching device arranged at every one of the R, G, B dots, one switching device is disposed in the first subpixel region to be connected with corresponding one of the gate lines and the first data line and another switching device is disposed in the second subpixel region to be connected with corresponding one of the gate lines and the second data line, thereby being oppositely disposed to each other against the data lines between two adjacent gate lines.

It is also provided to a liquid crystal display, comprising: a plurality of gate lines being spaced in a selected distance; a plurality of data lines being spaced in a selected distance, the data lines where a data line driving signal is provided being crossed with the gate lines, each of data lines being split into a pair of data lines, the split data lines being arranged in parallel with each other and simultaneously driven by the same data line driving signal; a plurality of R, G and B pixel regions defined by the gate lines and the data lines, each of the R. G and B pixel regions being divided into a pair of R, G and B subpixel regions; a plurality of R, G and B dots, each of the R, G and B dots being comprised of a pair of R, G and B subdots, each of the R, G and B subdots being disposed in each of the R, G, and B subpixel regions, respectively; and a plurality of switching devices disposed in the R, G, B pixel regions, each of the switching devices being connected to corresponding gate line and data line of a plurality of gate lines and data lines to drive each of the R, G and B subdots, respectively.

It is further provided to a liquid crystal display, comprising: a plurality of gate lines being spaced in a selected distance; a plurality of data lines being spaced in a selected distance, the data lines where a data line driving signal is provided being crossed with the gate lines, each of data lines being split into a pair of split data lines, the split data lines being arranged in parallel with each other and simultaneously driven by the same data line driving signal; a plurality of R, G and B pixel regions defined by the gate lines and the data lines, each of the R, G and B pixel regions being divided into a pair of R, G and B subpixel regions; a plurality of R, G and B dots, each of the R, G and B dots being comprised of a pair of R, G and B subdots, each of the R, G and B subdots being disposed in each of the R, G, and B subpixel regions, respectively; and a plurality of switching devices disposed in the R, G, B pixel regions, each of the switching devices being connected to corresponding gate line and data line of a plurality of gate lines and data lines to drive each of the R, G and B subdots, respectively;

wherein R, G and B pixel regions of the plurality of R, G, B pixel regions in adjacent gate lines are left-shifted or right-shifted by one subpixel region along the gate line respectively and the R, G and B dots which are disposed in the R, G are left-shifted or right-shifted by one subdot along the gate line respectively, thereby being arranged with a triangle form;

wherein when each of R, G and B pixel regions is split into the pair of R, G and B subpixel regions by the pair of the data lines, each of the R, G and B pixel regions which are defined by the odd gate lines is divided by the second data line of the split data lines and each of the R, G, B pixel regions which are defined by the even gate lines is divided by the first data line;

wherein the R, G and B dots are disposed in the R, G and B subpixel regions with a zig-zag form along the data lines and the first R, G and B subdots of the R, G, B dots are disposed in the first R, G and B sub pixel regions of the R, G, B pixel regions which are formed by the odd lines of the plurality of the gate lines and the first data line of the split data lines and the second R, G and B subdots of the R, G, B dots are disposed in the second R, G and B sub pixel regions of the R, G, B pixel regions which are formed by the even lines of the plurality of the gate lines and the second data line of the split data lines, thereby being are overlapped with the first R, G and B subdots; and wherein of the two switching device arranged at every one of the R, G, B dots, one switching device is disposed in the first subpixel region to be connected with corresponding one of the gate lines and the first data line and another switching device is disposed in the second subpixel region to be connected with corresponding one of the gate lines and the second data line, thereby being oppositely disposed to each other against the data lines between two adjacent gate lines.

According to another aspect of the present invention, it is provided to a liquid crystal display, comprising: a plurality of data lines being spaced in a selected distance; a plurality of gate lines being spaced in a selected distance, the gate lines where a gate line driving signal is provided being crossed with the data lines to define a plurality of pixel regions, each of gate lines being split into a pair of gate lines; a plurality of R, G and B dots disposed in the pixel regions, respectively; and a plurality of switching devices disposed in the pixel regions, each being connected to corresponding gate line and data line of a plurality of gate lines and data lines; wherein by the split gate lines, each of the pixel regions is divided into a plurality of sub pixel regions; and each of the R, G and B dots includes a plurality of R, G and B subdots, each of R, G and B subdots being disposed in each of sub pixel regions, respectively.

In accordance with another embodiment of the present invention, each of the R, G and B dots is comprised of a pair of the R, G and B subdots and each of the pixel regions is divided into a pair of the subpixel regions and in the pair of subdots, different subdots are disposed to. The pair of subdots are disposed in line adjacent subpixel regions along the gate lines and the pair of subdots which are connected to a first gate line of the pair of the gate lines, are connected to even data lines of the plurality of data lines and the pair of subdots which are connected to a second gate line of the pair of the gate lines, are connected to odd data lines of the plurality of the data lines. Of the plurality of the R, G, B dots, the R, G and B dots connected to the first gate line of the split gate lines are disposed in the order of R, G and B dots and the R, G, and B dots connected to the second gate line of the split gate lines are disposed in the order of B, R and G dots. Of the plurality of pixel regions, the pixel regions which are defined by the first gate line of the pair of split gate lines and corresponding one of the plurality of data lines, are left-shifted or right-shifted by one subpixel region along the gate line, against the pixel regions which are defined by the second gate line and corresponding one of the plurality of data lines. The pair of the split data lines are arranged in parallel with each other and are simultaneously driven by the same data line driving signal.

In accordance with another embodiment of the present invention, the pair of switching devices a disposed at every one of the of R, G and B dots so as for one switching device to drive one subdot. Of the pair of switching devices arranged at every one of the R, G, B dots, one switching device is disposed in a first subpixel region of the pair of subpixel regions to be connected with corresponding one of the data lines and the first gate line of the pair of split gate lines and another switching device is disposed in a second subpixel region to be connected with corresponding one of the data lines and the second gate line. Of the pair of switching devices disposed at every one of the pair of subpixel regions, the switching devices connected to the first gate line are connected to the even data lines of the plurality of data lines and the switching devices connected to the second gate line are connected to the odd data lines of the plurality of the data lines. thereby being disposed in the opposite portion of the pair of subpixel regions. Of switching devices disposed in the adjacent subpixel regions, the switching devices commonly connected to the first gate line are connected to the even data lines of the plurality of data lines and the switching devices connected to tile second gate line are connected to We odd data lines, thereby symmetrically disposed centering around the data line.

It is also provided to a liquid crystal display, comprising: a plurality of data lines being spaced in a selected distance; a plurality of gate lines being spaced in a selected distance, the gate lines being crossed with the data lines, each of gate lines being split into a pair of gate lines where the same gate line driving signal is provided; a plurality of pixel regions defined by the gate lines and the data lines, each of pixel regions being divided into a pair of subpixel regions by the pair of split gate lines; a plurality of R, G and B dots, each of R, G and B dots being comprised of a pair of subpixel regions which are disposed in the subpixel region respectively, different R, G and B subdots being disposed in the pair of pixel regions and the same R, G and B subdots being disposed in the adjacent subpixel regions; and a plurality of switching devices disposed in the pixel regions, each being connected to corresponding gate line and data line of a plurality of gate lines and data lines.

It is further also provided to a liquid crystal display, comprising: a plurality of data lines being spaced in a selected distance; a plurality of gate lines being spaced in a selected distance, the gate lines being crossed with the data lines, each of gate lines being split into a pair of gate lines where the same gate line driving signal is provided; a plurality of pixel regions defined by the gate lines and the data lines, each of pixel regions being divided into a pair of subpixel regions by tile pair of split gate lines; a plurality of R, G and B dots, each of R, G and B dots being comprised of a pair of subpixel regions which are disposed in the subpixel region respectively, different R, G and B subdots being disposed in the pair or pixel regions and the same R, G and B subdots being disposed in the adjacent subpixel regions, the pair of R, G and B subdots which are disposed in line in adjacent subpixel regions along the gate lines and are connected to the first gate line of the pair of split gate lines, are connected to the even gate lines of the plurality of data lines and the pair of R, G and B subdots which are disposed in line in adjacent subpixel regions along the gate lines and are connected to the second gate line of the pair of the split gate lines, are connected to the odd gate lines of the plurality of the data lines; and a plurality of switching devices disposed in the pixel regions, of the pair of switching devices arranged at every one of the dots, one is disposed to the first subpixel region to connect the first gate line and corresponding one of the plurality of data lines and another is disposed to the second subpixel region to connect the second gate line and corresponding one of the plurality of data lines.

According to further another aspect, it is provided to a liquid crystal display, comprising: a plurality of data lines being spaced in a selected distance; a plurality of gate lines being spaced in a selected distance, the gate lines being crossed with the data lines, each of gate lines being split into a pair of gate lines where the same gate line driving signal is provided; a plurality of pixel regions defined by the gate lines and the data lines, each of pixel regions being divided into a pair of subpixel regions by the pair of split gate lines; a plurality of R, G and B dots, each of R, G and B dots being comprised of a pair of subpixel regions which are disposed in the subpixel region respectively, different R, G and B subdots being disposed in the pair of pixel regions and in the adjacent subpixel regions, different R, G and B subdots being disposed along the gate line; a plurality of switching devices disposed in the pixel regions, each being connected to corresponding gate line and data line of a plurality of gate lines and data lines.

In accordance with another embodiment of the present invention, each pair of R, G and B subdots are arranged in a diagonal direction to the data line in the two adjacent subpixel regions, The R, G and B dots are arranged in the order of R, G and B subdots in the first gate line of the pair of the split gate lines and arranged in the order of B, R and G subdots in the second gate line of the pair of the split gate lines. Of the pair of switching devices arranged at every one of the dots, one is disposed to the first subpixel region to connect the first gate line and corresponding one of the plurality of data lines and another is disposed to the second subpixel region to connect the second gate line and corresponding one of the plurality of data lines. The pair of switching devices of the plurality of switching devices which are arranged in the pair of the subpixel regions, respectively, the switching device arranged in the first subpixel region is connected to the fist gate line of corresponding pair of the split gate line in the split gate line pairs and corresponding data line of the plurality of the data lines and the switching device arranged in the second subpixel region is connected to the first gate line of the next pair of the split gate lines and the next data line.

In accordance with a further embodiment of the present invention, to the first gate line of the pair of split gate lines, the first switching device arranged in the first subpixel region of corresponding pixel region of the plurality of the pixel regions, which may be referred to as the first switching device, and the switching device arranged in the second subpixel region in the previous pixel region, which may be referred to as the second switching device, are connected.

It is also provided to a liquid crystal display, comprising: a plurality of data lines being spaced in a selected distance; a plurality of gate lines being spaced in a selected distance, the gate lines being crossed with the data lines, each of gate lines being split into a pair of gate lines where the same gate line driving signal is provided; a plurality of pixel regions defined by the gate lines and the data lines, each of pixel regions being divided into a pair of subpixel regions by the pair of split gate lines; a plurality of R, G and B dots, each of R, G and B dots being comprised of a pair of subpixel regions which are disposed in the subpixel region respectively, different R, G and B subdots being disposed in the pair of pixel regions and in the adjacent subpixel regions, different R, G and B subdots being disposed along the gate line, each pair of R, G and B subdots are arranged in diagonal direction to the data line in the two adjacent subpixel regions; a plurality of switching devices disposed in the pixel regions, the switching devices arranged to the first subpixel regions line being connected to the first gate line of corresponding gate line pair and corresponding one of the plurality of data lines and the switching devices arranged in the second subpixel regions being connected to the first gate line of the next gate line pair and the next data line;

wherein the R, G and B dots are arranged in the order of R, G and B subdots in the first gate line of the pair of the split gate lines and arranged in the order of B, R and G subdots in the second gate line of the pair of the split gate lines; and wherein to the first gate line of the pair of split gate lines, the first switching device arranged in the first subpixel region of corresponding pixel region of the plurality of the pixel regions and the second switching device arranged in the second subpixel region in the previous pixel region are connected.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Figure 3:
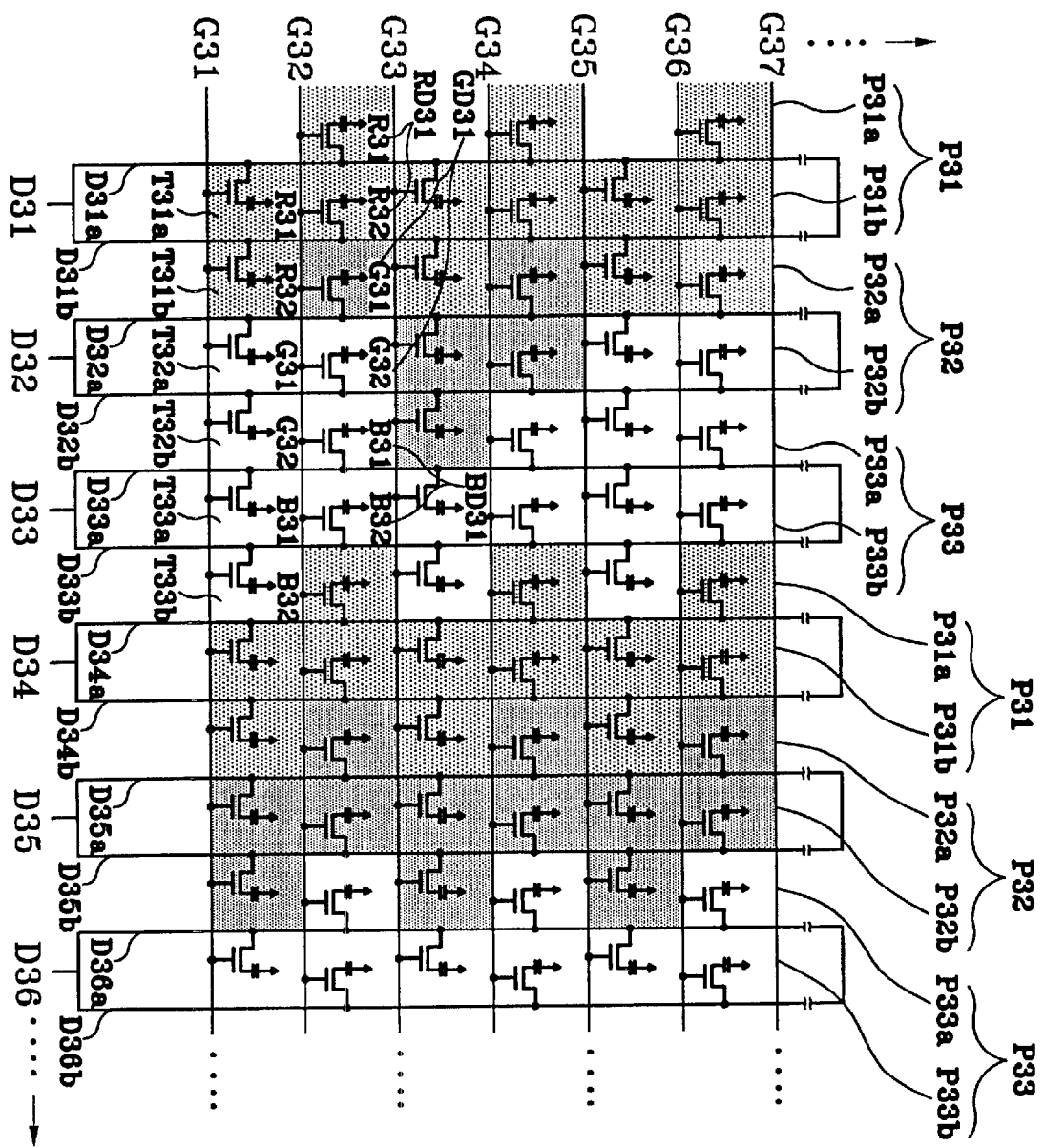
FIG. 3 is a plane view of a liquid crystal display with a triangular type pixel arrangement structure in accordance with an embodiment of the present invention.

FIG. 3 is a plane view of a liquid crystal display with a triangular type pixel arrangement structure in accordance with a first embodiment of the present invention. A plurality of gate lines G31, G32, G33, G34, . . . are elongated to a first direction which is a row direction and are spaced in a selected distance to be insulated with each other. A plurality of data lines D31, D32, D33, . . . are elongated to a second direction which is a column direction and are spaced in a selected distance to be insulated with each other. The data lines where a data line driving signal is provided, are crossed with the gate lines to define a plurality of red(R), green(G) and B(blue) pixel regions PS31–PS33. Each of data lines D31, D32, D33, . . . is split into a pair of data lines D31a and D31b, D32a and D32b, D33a and D33b, . . . which are in parallel with each other and simultaneously driven by the same data line driving signal.

By the split data lines, each of the R, G and B pixel regions PS31–PS33 is divided into a pair of R, G and B sub pixel regions PS31a and PS31b, PS32a and PS32b and PS33a and PS33b against the gate line of the row direction. Each of red(R), green(G) and blue(B) dots RD31, GD31 and BD31 which are disposed in turn into each of R, G and B pixel regions PS31, PS32 and PS33, includes a pair of R, G and B subdots R31 and R32, G31 and G32, and B31 and each of R, G and B subdots R31 and R32, G31 and G32, and B31 and B32 is disposed in each of R, G and B sub pixel regions PS31a and PS31b, PS32a and PS32b, and PS33a and PS33b, respectively. At this time, the first subdots R31, G31 and B31 of the pair of subdots are disposed to correspond to a first data line D31a, D32a, . . . of the split data lines D31, D32, . . . and second subdots R32, G32 and B32 of the R, G and B subdots are disposed to correspond to a second data line D31b, D32b, . . . of the split data lines D31, D32, . . . When each of R, G and B pixel regions PS31–PS33 is split into the pair of R, G and B subpixel regions PS31a and PS31b through PS33a and PS33b, each of the R, G and B pixel regions which are defined by the odd gate lines G31, G33, . . . is divided by the second data line D31b, D32b, . . . of the split data lines D31, D32, . . . and each of the R, G, B pixel regions which are defined by the even gate lines G32, G34, . . . is divided by the first data line D31a, D32a, . . . .

Therefore, R, G and B pixel regions of the plurality of R, G, B pixel regions in adjacent gate lines are left-shifted or right-shifted by one subpixel region along the gate line respectively and the R, G and B dots which are disposed in the R, G and B pixel regions are left-shifted or right-shifted by one subdot along the gate line respectively, thereby being arranged with a triangular form. According to this, the R, G and B dots RD31, GD31, and BD31 are disposed in the R, G and B pixel regions PS31–PS33 with a zig-zag form along the data lines D31, D32, . . . . The first R, G and B subdots R31, G31 and B31 of the R, G, B subdots R31 and R32, G31 and G32 and B31 and B32 are disposed in the first R, G and B sub pixel regions PS31a, PS32a and PS33a of the R, G, B pixel regions PS31–PS33 which are formed by the odd lines G31, 033, of the plurality of the gate lines G31, G32, G33, G34, and the first data line D31a, D32a, . . . of the split data lines D31, D32, and the second R, G and B subdots R32, G32 and B32 of the R, G, B subdots R31 and R32, G31 and G32 and B31 and B32 are disposed in the second R, G and B sub pixel regions PS31b, PS32b and PS33b of the R, G, B pixel regions PS31–PS33 which are formed by the even lines G32, G34, . . . of the plurality of the gate lines G31, G32, G33, G34, and the second data line D31b, D32b, . . . of the split data lines D31, D32, . . . . Therefore, the second R, G and B subdots are overlapped with the first R, G and B subdots in adjacent gate lines. Thus, the first R subdot R31 of the R dots RD31 in the odd gate lines G31, G33, . . . and the second subdots R32 in the even gate lines G32, G34, . . . and the first G31 subdots G31 of the G dots GD31 in the odd gate lines G31, G33, . . . and the second G subdots G32 in the even gate lines G32, G34, . . . and the first B subdots B31 of the B dots BD31 in the odd gate lines G31, G33, . . . and the second B subdots B32 in the even gate lines G32, G34, . . . are overlapped, respectively.

In the first embodiment of the present invention, at every one of the R, G and B dots, a pair of switching devices T31*a* and T31*b*, T32*a* and T32*b* and T33*a* and T33*b*, which is a thin film transistor (TFT) are disposed at the intersections of the gate lines and the data lines in the R, G, B pixel regions PS31–PS33 and a gate electrode and a source or drain electrode of the TFT are connected to corresponding gate line and data line of a plurality of gate lines and data lines. Of the two switching device arranged at every one of the R, G, E dots, the first TFTs T31*a* T32*a* and T33*a* are disposed in the first subpixel regions PS31*a*, PS32*a* and PS33*a*, respectively and a gate electrode and a source or drain electrode of the first TFT are connected to corresponding one of the gate lines and the first data line D31*a*, D32*a* and D33*a*, . . . and the second TFTs T31*b*, T32*b* and T33*b* are disposed in the second subpixel regions PS31*b*, PS32*b* and PS33*b* and a gate electrode and a source or drain electrode of the second TFT are connected to corresponding one of the gate lines and tie second data line D31*b*, D32*b*, D33*b*, . . . , thereby being oppositely disposed to each other against the data lines between two adjacent gate lines.

In the TFT-LCD of the first embodiment of the present invention as constructed, R, G and B dots RD31, GD31 and BD31 are divided into two R, G and subdots R31 and R32, G31 and G32 and B31 and B32, respectively and left-shifted or right-shifted to be overlapped with each other in adjacent gate lines. That is, R, G and B dots in the odd gate lines is right-shifted by 1 subdot to the R, G and B dots in the even gate lines and the R, G and B dots in the even gate lines is left-shifted by 1 subdot to the R, G and B dots in the odd gate lines. Accordingly, if drives R, G, and B dots connected to the same data line along the gate line which is a scanning line, the LCD of the present invention forms a triangular pixel arrangement. For example, in case of the first data line D31 comprised of the pair of split data lines D31*a* and D31*b*, R dot RD31 is driven with a zig-zag form with sequentially driving the gate lines to arrange with a triangular pixel arrangement. Similarly, G dot GD31 in the second data line D32 and B dot BD31 in the third data line D33 are driven with a triangular pixel arrangement, thereby capable of displaying graphics of an oblique type.

Figure 1:
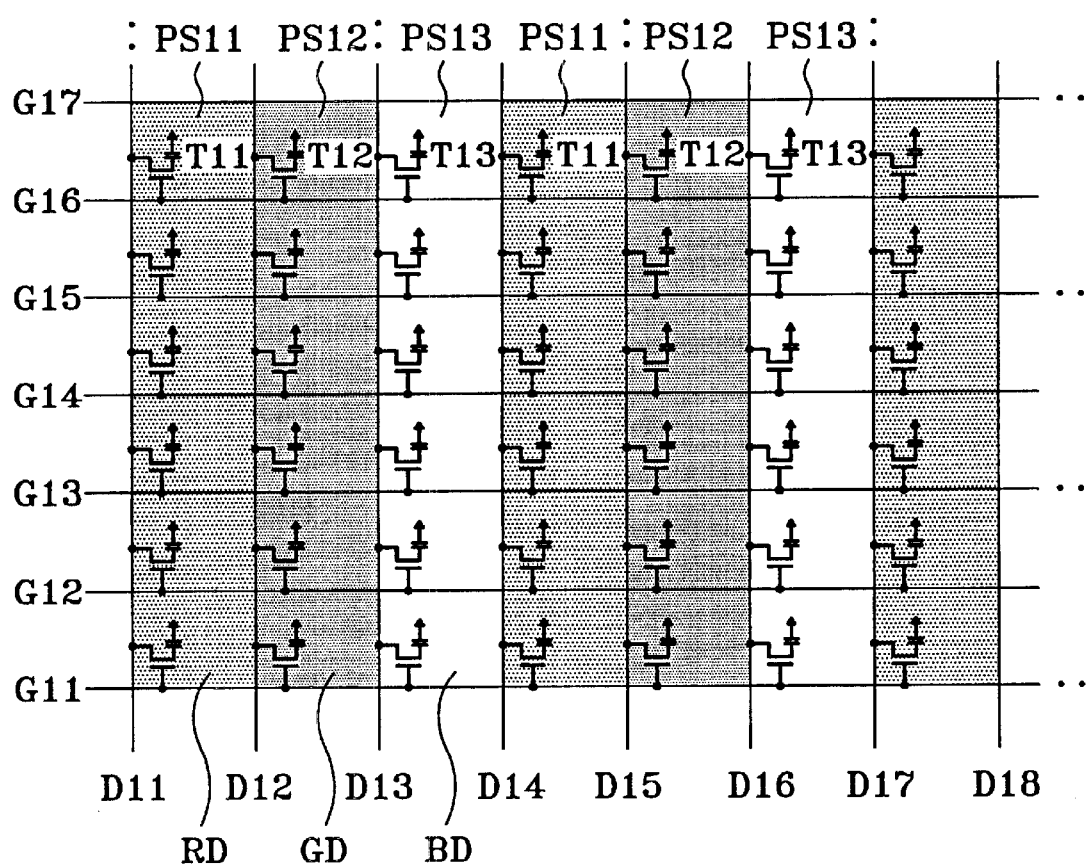
FIG. 1 is a plan view of a liquid crystal display with a stripe type pixel arrangement structure in the prior art.
Figure 2:
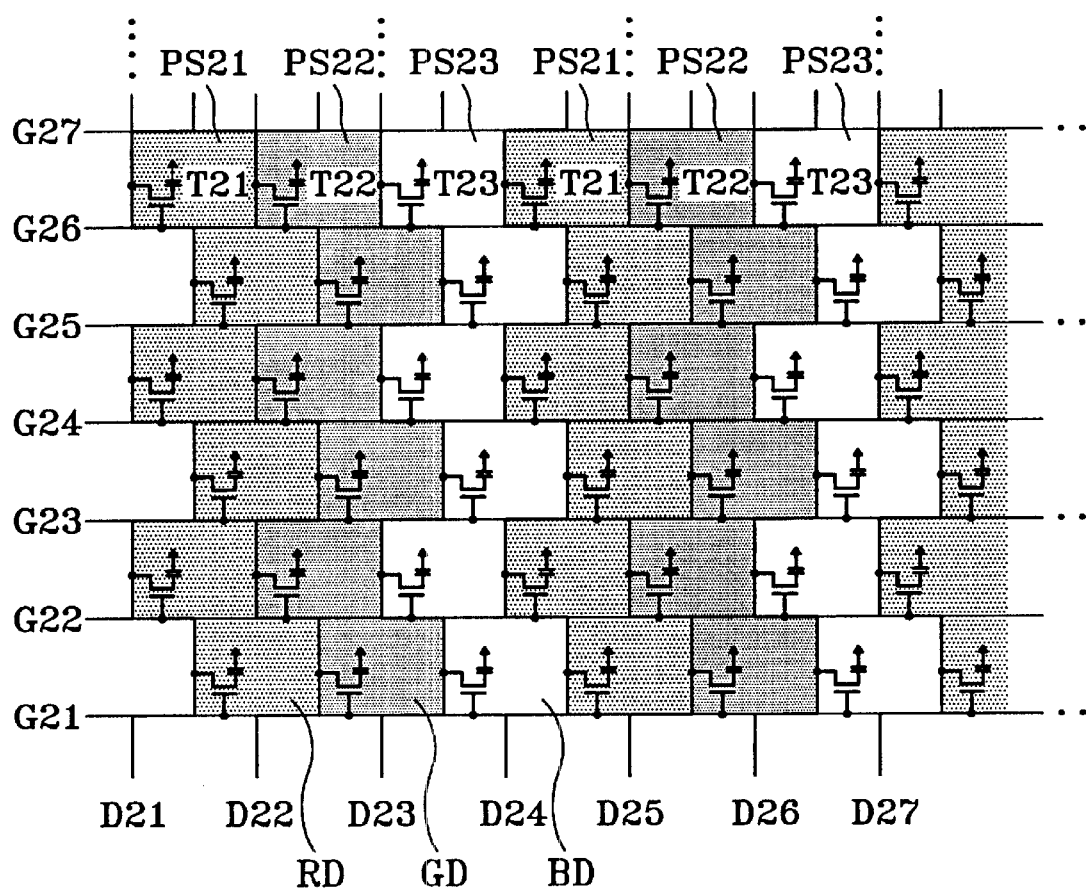
FIG. 2 is a plan view of a liquid crystal display with a triangular type pixel arrangement structure in another prior art.

Furthermore, the TFT-LCD of the first embodiment is capable of a redundancy to open fails of the data lines. The prior TFT-LCD shown in FIG. 1 and FIG. 2 are impossible to redundancy to open fails of the data lines. For example, when open fails are occurred in the second data lines D12 and D22 of FIG. 1 and FIG. 2, it can not drive the switching devices connected to the second data line which is open-failed, thereby being impossible to drive the G dots. However, in the TFT-LCD of the first embodiment shown in FIG. 3, in case where open fails in D32*a* of the data line D32 including the pair of split data lines D32*a* and D32*b*, the first subdot G31 of G dot GD31 is not driven due to open fail and the second subdot G32 is driven, thereby being capable of redundancy of open fails of the data lines.

Figure 4:
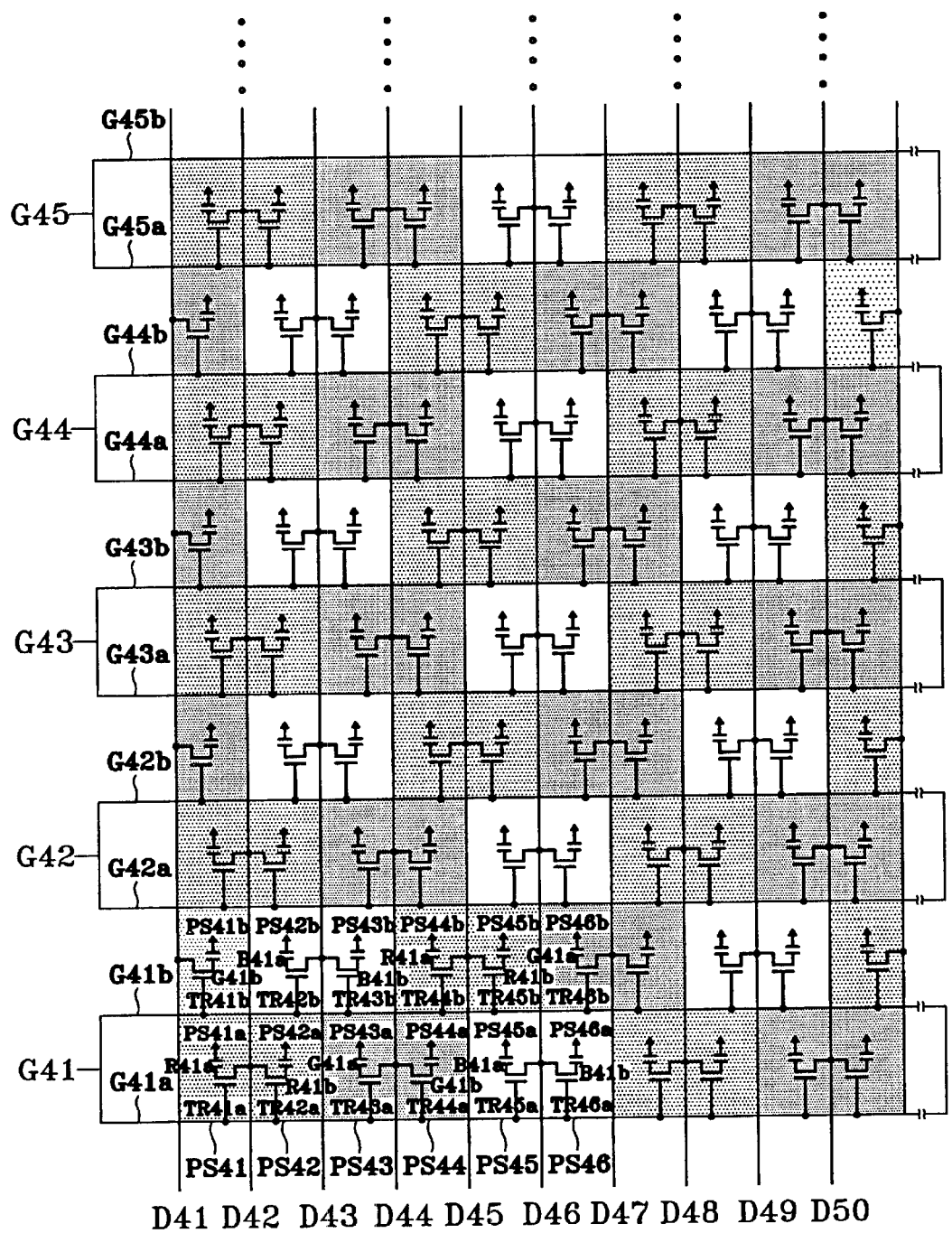
FIG. 4 is a plan view of a liquid crystal display with a triangular type pixel arrangement structure in accordance with another embodiment of the present invention.

FIG. 4 is a plane view of a liquid crystal display with a triangular type pixel arrangement structure in accordance with a second embodiment of the present invention. A plurality of gate lines G41, G42, G43, G44, . . . are elongated to a first direction which is a row direction and are spaced in a selected distance to be insulated with each other. A plurality of data lines D41, D42, D43, . . . are elongated to a second direction which is a column direction and are spaced in a selected distance to be insulated with each other.

The gate lines where a gate line driving signal is provided, are crossed with the data lines to define a plurality of pixel regions PS41–PS46. Each of gate lines G41, G42, G43, . . . is split into a pair of gate lines G41*a* and G41*b*, G42*a* and G42*b*, G43*a* and G43*b*, . . . which are in parallel with each other and simultaneously driven by the same gate line driving signal.

By the split gate lines, each of the pixel regions PS41–PS46 is divided into a pair of sub pixel regions PS41*a* and PS41*b* through PS46*a* and PS46*b* along the data line of the column direction. At this time, each of the pixel regions PS41 through PS46 is divided into a second gate line G41*a*, G42*a*, . . . of split gate line pair G41*a* and G41*b*, G42*a* and G42*b*, . . . The R, G and B subdots R41*a* and R41*b*, G41*a* and G41*b* and B41*a* and B41*b* which is disposed into the subpixel regions PS41*a* and PS41*b* through PS46*a* and PS46*b*, respectively. The subdots are regularly arranged in the subpixel regions and in the pair of the subpixel regions, different subdots are arranged. Referring to FIG. 4, R, G and B subdots are regularly arranged to the pair of subpixel regions PS41*a* and PS41*b* through PS46*a* and PS46*b* in the period of six data lines and the R, G and B dots RD41, GD41 and BD41 which is comprised of the pair of R, G and B subdots R41*a* and R41*b*, G41*a* and G41*b* and B41*a* and B41*b* are arranged in line along the gate line in adjacent subpixel regions.

For example, the R subdots R41*a* and R41*b* are arranged in line along the first gate lines G41*a*, G42*a*, . . . of the split gate line pairs in adjacent first and second data lines D41 and D42. The B subdots B41*a* and B41*b* are arranged in line along the second gate lines G41*b*, G42*b*. . . of the split gate line pairs in adjacent second and third data lines D42 and D43. The G subdots G41*a* and G41*b* are arranged in line along the first gate lines G41*a*, G41*b*, . . . in adjacent third and fourth data lines D43 and D44. The R subdots R41*a* and R41*b* are arranged in line along the second gate lines G41*b*, G42*b*, . . . in adjacent fourth and fifth data lines D44 and D45. The B subdots B41*a* and B41*b* are arranged in line along the first gate lines G41*a*, G42*a*, . . . in adjacent fifth and sixth data lines D45 and D46.

In the second embodiment of the present invention, at every one of the R, G and B dots, a pair of switching devices which are consist of a tin film transistor (TFT) are arranged. That is, one switching device is arranged in one subpixel region to drive one subdot. In the pairs of subpixel regions PS41*a* and PS41*b* through PS46*a* and PS46*b*, the pairs of switching devices T41*a* and T41*b* through T46*a* and T46*b* for driving the pairs of subdots where a gate electrode and a source/drain electrode are connected to corresponding one of the plurality of gate lines and corresponding one of the plurality of data lines, are arranged to at interconnection portions of the gate lines and the data lines in the pairs of subpixel regions. At this time, of switching devices T41*a* and T41*b* through T46*a* and T46*b* which are arranged in every dot pair, the first switching devices T41*a* through T46*a* are arranged in the fist subpixel regions PS41*a* through PS46*a* and be connected to corresponding one of the first gate lines G41*a*, G42*a*, . . . of the split gate line pairs G41, G42, and corresponding one of the plurality of the data lines D41, D42, . . . and second switching devices T41*b* through T46*b* are arranged in tic second subpixel regions PS41*b* through PS46*b* and be connected to corresponding one of the second gate lines G41*b*, G42*b*. . . of tile split gate line pairs G41, G42, . . . and corresponding one of the plurality of the data lines D41, D42, . . . . That is, TFT switching devices are arranged in the pixel regions PS41–PS46 to connect tie gate electrodes thereof to the split gate line pair respectively and to connect the source/drain electrodes thereof to two adjacent data lines respectively, so that the switching device pair connected to the split gate line pair are oppositely disposed in the subpixel region pair against tie data lines.

Besides, TFT switching devices T41a and T42a, T42b and T43b, T43a and T44a, . . . for driving the same subdots R41a and R42a, G41a and G41b and B41a and B41b which are arranged in line along the gate lines in adjacent data lines D41 and D42, D42 and D43, D43 and D144, . . . , are arranged in line along the gate line to connect the gate electrodes thereof to the same gate line and to connect the source/drain electrodes thereof to the same data line, thereby being symmetrically arranged centering around the data line. That is, of TFT switching devices arranged in line against one data line, electrodes of all TFT switching devices T41a and T41b, T42a and T42b, . . . which are connected the odd date lines D43, D45, . . . , are connected to the first gate lines G41a, G42a, . . . of the split gate line pairs and electrodes of all TFT switching devices T41a and T42a, T42b and T43b, T43a and T44a. . . which are connected the even date lines D42, D441 . . . , are connected to the second gate lines G41b, G42b, . . . of the split gate line pairs.

Therefore, gate electrodes of adjacent TFT switching devices T41a and T42a, T43a and T44a, . . . arranged between the odd and the even data lines D41 and D42, 143 and D44, . . . , are connected to the first gate lines of the split gate line pairs and gate electrodes of adjacent TFT switching devices T42b and T43b, T44b and T45b, . . . between the even and odd gate lines D42 and D43, D44 and D45, . . . , are connected to the second gate lines of the split gate line pairs.

According to the second embodiment, subdots R41a and R41b of the same color are arranged in line in adjacent subpixel regions along the gate line and two same subdots arranged in line are shifted by one subdot along the gate line, so that in subpixel pairs of the pixel regions, R, G and B subdots of different colors are arranged. For example, the R subdots R41a and R41b arranged in line along the first gate line are shifted by one subdot against the B subdots B41a and B41b arranged in line along the second gate line and the R subdots R41a and R41b arranged in line along the second gate line are shifted by one subdot against the G subdots G41a and G41b arranged in line along the first gate line. Therefore, whenever the data lines are sequentially driven, subdots arranged along the gate line pair are driven by the corresponding switching devices arranged in line along the gate line, thereby driving the R, G and B dots RD41, GD41 and BD41 along the data line, in turn.

When the subdots arranged along the split gate line pairs are driven along the data lines, the subdots connected to the first and second gate lines are sequentially driven along the data line. That is, when subdots connected to the same gate line pair are sequentially driven the subdots are left- or right-shifted and upper- or lower-shifted by one subdot, so that the R, G and B dots are driven with a triangular form. For example, when the second data line D42 is driven, the switching devices T41a and T41b connected to the second data line D42 and the first gate line G41a, G42a, . . . are simultaneously driven to drive the R subdots arranged in line along the gate line, thereby driving the R dot. When the third data line D43 is driven, the switching devices T42b and T43b connected to third data line D43 and the second gate line G41b, G42b, . . . are simultaneously driven to drive the B subdots arranged in line along the gate line, thereby driving the B dot. At this time, the R dot and B dots are upper and right-shifted by one subdot.

Subsequently, when the fourth data line D44 is driven, the switching devices T43a and T44a connected to the fourth data line D44 and the first gate line G41a, G42a, . . . , are simultaneously driven to drive the G subdots arranged in line along the gate line, thereby driving the G dot. At this time, G dot is lower and right-shifted by one subdot rather than the B dot driven in driving the third data line D43. When the fifth data line D45 is driven, the switching devices T44b and T45b connected to the fifth data line D45 and the second gate line G41b, G42b, . . . , are simultaneously driven to drive the R subdots arranged in line along the gate line, thereby driving the R dot. At this time, B dot is upper and right-shifted by one subdot rather than the G dot driven in driving the fourth data line D44.

According to the TFT-LCD of the second embodiment, Each R, G and B dots are upper- or lower-shifted and left- or right-shifted by one subdot in subsequently driving the data lines, thereby driving the R, G and B dots with a triangular form. In the prior TFT-LCD of FIG. 1 and FIG. 2, it is impossible to redundancy of open fails of the gate lines. For example, in case open fails are occurred in the gate lines G12 and G22 of FIG. 1 and FIG. 2, the switching devices connected to the open failed gate line G12 or G22 are not driven and therefore the R, G and B dots of the open failed gate line are not driven, thereby being incapable of redundancy. However, in the second embodiment, if open fail is occurred in G41b of the gate line pair G41a and G41b, the subdots connected to the second gate line G41b are not driven, but the subdots connected to the first gate line G41a are driven, thereby being capable of color display in the gate line G41. Therefore, in the second embodiment, it is possible to redundancy of the open fails in the gate lines by splitting one gate line into the pair of the split gate lines.

Figure 5:
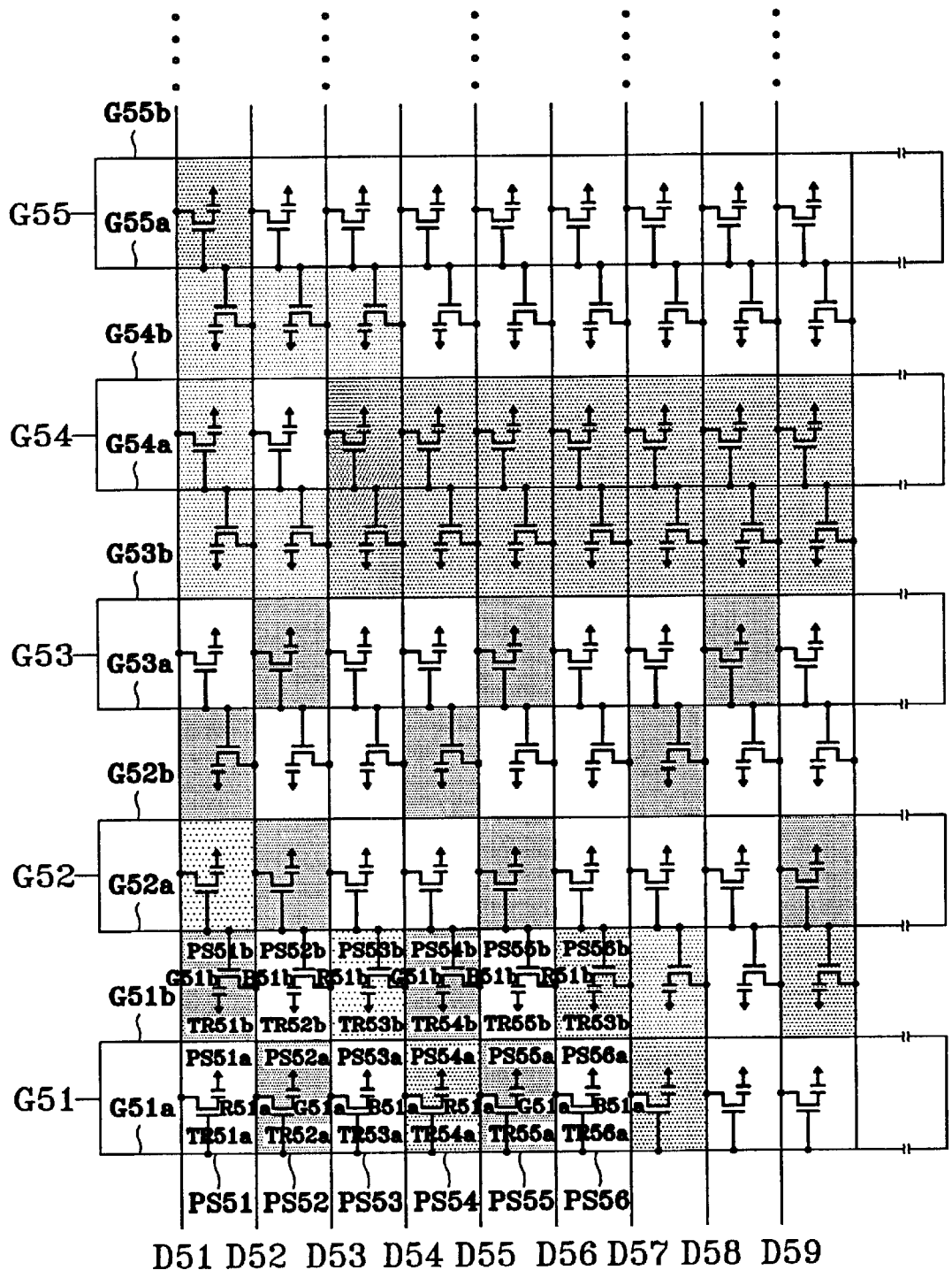
FIG. 5 is a plan view of a liquid crystal display with a mosaic type pixel arrangement structure in accordance with further another embodiment of the present invention.

FIG. 5 is a plane view of a liquid crystal display with a mosaic type pixel arrangement structure in accordance with a third embodiment of the present invention. A plurality of gate lines G51, G52, G53, G54, . . . are elongated to a first direction which is a row direction and are spaced in a selected distance to be insulated with each other. A plurality of data lines D51, D52, D53, . . . are elongated to a second direction which is a column direction and are spaced in a selected distance to be insulated with each other. The gate lines where a gate line driving signal is provided, are crossed with the data lines to define a plurality of pixel regions PS51–PS56. Each of gate lines G51, G52, G53, . . . is split into a pair of data lines G51a and G51b, G52a and G52b, G53a and G53b, . . . which are in parallel with each other and simultaneously driven by the same gate line driving signal.

By the split gate lines, each of the pixel regions PS51–PS56 is divided into a pair of sub pixel regions PS51a and PS51b through PS53a and PS53b along the data line of the column direction. At this time, each of the pixel regions is divided into a second gate line G51b, G52b, . . . of split gate line pair G51a and G51b, G52a and G52b, . . . . The R, G and B sub dots RD51, GD51 and BD51 which is disposed into the subpixel regions PS51a and PS51b through PS56a and PS56b, respectively. The subdots are regularly arranged in the subpixel regions and in the pair of the subpixel regions, subdots for different colors are arranged. Referring to FIG. 5, R, G and B subdots are regularly arranged in the pair of subpixel regions PS51a and PS51b through PS56a and PS56b in the period of three data lines and the R, G and B dots RD51, GD51 and BD51 which is comprised of the pair of R, G and B subdots R51a and R51b, G51a and G51b and B51a and B51b are arranged in subpixel regions of adjacent pixel regions to the orthogonal direction line in adjacent data lines.

For example, in the first and second data lines D51 and D52, the G subdots G51a and G51b are arranged in the second subpixel region PS51*b* of the first pixel region PS51 and the first subpixel region PS52*a* of the second pixel region PS52 to the orthogonal direction against the second data line D52. In the second and third data lines D52 and D53, the B subdots G51*a* and G51*b* are arranged in the first subpixel region PS52*b* of the second pixel region PS52 and the first subpixel region PS53*a* of the third pixel region PS53 to the orthogonal direction against the third data line D53. In the third and fourth data lines D53 and D54, the R subdots R51*a* and R51*b* are arranged in the second subpixel region PS51*b* of the third pixel region PS53 and the first subpixel region PS51*a* of the fourth pixel region PS54 to the orthogonal direction against the fourth data lines D54. Thus, the G subdots G51*a* and G51*b* are orthogonally arranged to the second data line D52 with a zig-zag form in the first and second data lines D51 and D52. The B subdots B51*a* and B51*b* are orthogonally arranged to the third data line D53 with a zig-zag form in the second and third data lines D52 and D53. The R subdots R51*a* and R51*b* are orthogonally arranged to the fourth data line D54 with a zig-zag form in the third and fourth data lines D53 and D54.

in the third embodiment of the present invention, at every one of the It G and B dots, a pair of switching devices which are consist of a thin film transistor (TFT) are arranged. That is, one switching device is arranged in one subpixel region to drive one subdot. In the pairs of subpixel regions PS51*a* and PS51*b* through PS56*a* and PS56*b*, the pair of switching devices T51*a* and T51*b* through T56*a* and T56*b* for driving the pairs of subdots where a gate electrode and a source/drain electrode are connected to corresponding one of the plurality of gate lines and corresponding one of the plurality of data lines, are arranged to at interconnection portions of the gate lines and the data lines in the pairs of subpixel regions. At this time, of switching devices T51*a* and T51*b* through T56*a* and T56*b* which are arranged to every dot pair, first switching devices T51*a* through T56*a* are arranged in the first subpixel regions PS51*a* through PS56*a* and be connected to corresponding one of the first ate lines G51*a*, G52*a*, . . . of the split gate line pairs G51, G52, . . . and corresponding one of the plurality of the data lines D51, D52, . . . and second switching devices T51*b* through T56*b* are arranged in the second subpixel regions PS51*b* trough PS56*b* and be connected to following one of the first gate lines G51*a*, G52*a*, . . . of the split gate line pairs GS51, G52, . . . and following one of the plurality of the data lines D51, D52, . . . . Accordingly, the TFT switching devices arranged in the subpixel region pairs PS51*a* and PS51*b* through PS56*a* and PS56*b* of the pixel regions PS51 through PS56 are oppositely arranged against the second gate line of the split gate line pairs.

For example, in the TFT switching device T51*a* arranged in the first subpixel region PS51*a* of the pixel regions PS51, a gate electrode is connected to the first gate line G51*a* of the first gate line pair G51*a* and G51*b* and a source/drain electrode is connected to the first data line D51. In the TFT switching device T51*b* arranged in the second subpixel region PS51*b*, a gate electrode is connected to the first gate line G52*a* of the second gate line pair G52*a* and G52*b* and a source/drain electrode is connected to the second data line D52. Besides, TFT switching devices T51*b* and T52*a*, T52*b* and T53*a*, T53*b* and T54*a*, . . . for driving the subdots T51*a* and R51*b*, G51*a* and G51*b* and BS51*a* and B51*b* for the same color, are orthogonally arranged against one of adjacent data lines. For example, in the TFT switching device T51*b* for driving the subdot G51*b* which is arranged in the second subpixel region PS51*a* of the first pixel region PS51 among the subdots G51*a* and G51*b* for the same color which are orthogonally arranged against the second data line D52 in the first data line D51 and the second data line D52, a gate electrode is connected to the first gate line G52*a* of the second split gate line pair G52 which corresponds to the following scanning line and a source/drain electrode is connected to the following data line D52. On the other hand, in the TFT switching device T51*a* for driving the subdot G51*a* which is arranged in the second subpixel region PS52*a* of the second pixel region PS52 among the subdots G51*a* and G51*b* for the same color, a gate electrode is connected to the first gate line G51*a* of the first gate line pair G51 which corresponds to the present scanning line and a source/drain electrode is connected to corresponding one of the data lines. That is, the switching devices for driving the subdots for the same color which orthogonally arranged in adjacent data lines are commonly connected to one of the adjacent data lines.

Besides, the subdots for the same color in two adjacent data lines are orthogonally arranged along the gate line with one subdot shift and subdots for the same color orthogonally arranged in the order of R, G, B dots along the gate line, so that the subdots for different colors are arranged in the subpixel region pair of the pixel region.

Accordingly, in the TFT-LCD of the third embodiment, when the data lines are sequentially driven, the subdots arranged along the split gate line pair are driven by the two TFT switching devices orthogonally arranged, thereby driving the R, G and B dots RD51, GD 51 and BD51 along the data line with a mosaic pixel arrangement. When the subdots arranged along the split gate line pair are sequentially driven, the two subdots orthogonally arranged to the same data line are sequentially driven. When the data lines are sequentially driven, the subdots connected to the same split gate line pair are upper- or lower-shifted and left- or right-shifted, thereby being driven with a mosaic form. For example, when drives data line D52, the TFT switching devices T51*b* and T52*a* connected to the first gate line G51*a*, G52*a*, . . . of the split gate line pairs and the data line D52 are driven to drive the G subdots G51*a* and G51*b* orthogonally arranged to each other, thereby driving the G dot GD51. When drives data line D52, the TFT switching devices T52*b* and T53*a* connected to the first gate line G51*a*, G52*a*, . . . of the split gate line pairs and the data line D53 are driven to drive the B subdots B51*a* and B51*b* orthogonally arranged to each other, thereby driving the B dot BD51. At this time, the B dot BD51 is right-shifted by one subdot against the G dot GD51.

In the TFT-LCD of the third embodiment, with sequentially driving the data lines, the R, G and B dots RD51, GD51 and BD51 are driven to be left- or right-shift and upper- or lower-shifted, thereby driving the R, G, and B subdots with a mosaic form. In the prior TFT-LCD of FIG. 1 and FIG. 2, it is impossible to redundancy of open fails of the gate lines. For example, in case open fails are occurred in the gate lines G12 and G22 of FIG. 1 and FIG. 2, the switching devices connected to the open failed gate line G12 or G22 are not driven and therefore the R, G and B dots of the open failed gate line are not driven, thereby being incapable of redundancy. However, in the third embodiment, if open fail is occurred in G52*a* of the gate line pair G52*a* and G52*b*, the subdots connected to the first gate line G52*a* are not driven but the subdots disposed in the remaining subpixel regions are driven by the first gate line pair and the second gate line pair, thereby being capable of color display in the gate line G52. Therefore, in the third embodiment, it is possible to redundancy of the open fails in the gate lines by splitting one gate line into the pair of the split gate lines.

According to the present invention, the TFT-LCD divides the gate lines or data lines into a pair of split gate lines or a pair of split data lines and divides the pixel regions into a pair of subpixel regions to dispose the R, G and B subdots, driving the R, G and B dots with a triangular form or a mosaic form. Therefore, the TFT-LCD can display graphics of an oblique type and improve the color characteristics desired in an A/V TFT-LCD. Besides, the TFT-LCD of the present invention, data lines are elongated in straight to arrange the pixels with a triangular form or a mosaic form. Therefore, the length of the data line is reduced as compared with the prior TFT-LCD with a triangular form so that RC delay time can be reduced. Furthermore, in the TFT-LCD of the present invention, the gate line or the data line is formed with split lines and although the open fails is occurred in one the split lines or the split data lines, the pixel can be driven by another split gate line or data line. Therefore, it is capable of redundancy of the open fails so that the yield can be improved.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A liquid crystal display, comprising:
    a plurality of data lines being spaced from each other at a selected distance,
    a plurality of gate lines being spaced from each other at a selected distance, the gate lines where a gate line driving signal is provided being crossed with the data lines to define a plurality of pixel regions, each of the gate lines being split into a pair of split gate lines;
    a plurality of It, G and B dots disposed in the pixel regions, respectively; and
    a plurality of switching devices disposed in the pixel regions, each being connected to a corresponding gate line and data line of the plurality of gate lines and data lines, wherein each of the pixel regions is divided into a plurality of sub pixel regions by the split gate lines, and each of the, R, G and B dots includes a plurality of R, G and B subdots, each of the R, G and B subdots being disposed in each of the sub pixel regions, respectively.

2. The liquid crystal display as claimed in claim 1, wherein each of the R, G and B dots is comprised of a pair of the R, G and B subdots and, for each of the pixel regions being divided into a pair of subpixel regions, and each pair of the subdots are disposed in different subpixel regions.

3. The liquid crystal display as claimed in claim 2, wherein the pair of subdots are disposed in adjacent subpixel regions in-line along the gate lines, and the pair of subdots, which are connected to a first gate line of the pair of the gate lines, are connected to even data lines of the plurality of data lines and the pair of subdots, which are connected to a second gate line of the pair of the gate lines, are connected to odd data lines of the plurality of the data lines.

4. The liquid crystal display as claimed in claim 3, wherein of the plurality of the R, G, B dots, the R, G and B dots connected to the first gate line of the gate lines are disposed in the order of R, G and B dots, respectively, and the R, G, and B dots connected to the second gate line of the gate lines are disposed in the order of B, R and G dots, respectively.

5. The liquid crystal display as claimed in claim 4, wherein of the plurality of pixel regions, the pixel regions which are defined by the first gate line of the pair of split gate lines and corresponding one of the plurality of data lines, are left-shifted or right-shifted by one subpixel region along the gate line, relative to the pixel regions which are defined by the second gate line and corresponding one of the plurality of data lines.

6. The liquid crystal display as claimed in claim 5, wherein plurality of data lines are arranged in pairs and each data line of the pair of data lines are parallel with the other of the pair of data lines mid the pair of data fines are simultaneously driven by the same data line driving signal.

7. The liquid crystal display as claimed in claim 6, wherein of the pair of switching devices arranged at every one of the R, G, B dots, one switching device is disposed in a fist subpixel region of the pair of subpixel regions to be connected with corresponding one of the data lines and the first gate line of the pair of split gate lines and another switching device is disposed in a second subpixel region to be connected with corresponding one of the data lines and the second gate line.

8. The liquid crystal display as claimed in claim 7, wherein of the pair of switching devices disposed at every the pair of subpixel regions, the switching devices connected to the first gate line are connected to the even data lines of the plurality of data lines and the switching devices connected to the second gate line are connected to the odd data lines of the plurality of the data lines, thereby being disposed in the opposite portion of the pair of subpixel regions.

9. The liquid crystal display as claimed in claim 8, of the switching devices disposed in die adjacent subpixel regions, the switching devices commonly connected to the first gate line are connected to even data lines of the plurality of data lines and the switching devices connected to the second gate line are connected to odd data lines, thereby symmetrically disposed centering around the data line.

10. The liquid crystal display as claimed in claim 5, wherein a pair of switching devices ale disposed at every one of the R, G and B dots so as for one switching device to drive one subdot.

11. A liquid crystal display, comprising:
    a plurality of data lines being spaced from each other at a selected distance;
    a plurality of gate lines being spaced from each other at a selected distance, the gate lines being crossed with the data lines, each of the gate lines being split into a pair of split gate lines where the same gate line driving signal is provided;
    a plurality of pixel regions defined by the gate lines and the data lines, each of pixel regions being divided into a pair of subpixel regions by the pair of split gate lines;
    a plurality of R, G and E dots, each of R, G and B dots being comprised of a pair of subpixel regions which are disposed in the subpixel region respectively, different R, G and B subdots being disposed in the pair of pixel regions and the same R, G and B subdots being disposed in the adjacent subpixel regions; and
    a plurality of switching devices disposed in the pixel regions, each switching device comprising a pair of switching devices, and one each of the pair of switching devices being respectively connected to a corresponding gate line and a data line of a plurality of gate lines and data lines.

12. The liquid crystal display as claimed in claim 11, wherein the pair of R, G and B subdots which are disposed in adjacent subpixel regions in line along the gate lines and are connected to a first gate line of the pair of split gate lines are connected to the even data lines of the plurality of data lines and the pair of R, G and B subdots which are disposed in line in adjacent subpixel regions along the gate lines and are connected to a second gate line of the pair of the split gate lines are connected to the odd data lines of the plurality of the data lines.

13. The liquid crystal display as claimed in claim 12, wherein the R, G and B dots are arranged in the order of R, G and B dots in the first gate line of the pair of the split gate lines and arranged in the order of B, R and G dots in the second gate line of the pair of the split gate lines.

14. The liquid crystal display as claimed in claim 12, wherein the pixel region defined by the first gate line of the split gate lines and corresponding one of the plurality of the data lines is left-shifted or right-shifted along the gate line against the pixel region defined by the second gate line and corresponding one of the split gate lines.

15. The liquid crystal display as claimed in claim 14, wherein of the pair of switching devices arranged at every dot, one is disposed to tile first subpixel region to connect the first gate line and corresponding one of the plurality of data lines and another is disposed to the second subpixel region to connect the second gate line and corresponding one of the plurality of data lines.

16. The liquid crystal display as claimed in claim 15, wherein the switching devices of the plurality of switching devices, which are connected to the first gate line, are connected to the even data lines of the plurality of data lines and the switching devices of the plurality of switching devices, which are connected to the second gate line, are connected to the odd data lines of the plurality of the data lines.

17. The liquid crystal display as claimed in claim 16, wherein the pair of R, G and B subdots, which are disposed in adjacent subpixel regions in line along the gate lines and are connected to the first gate line of the pair of split gate lines, are connected to the even data lines of the plurality of data lines and the pair of R, G and B subdots, which are disposed in adjacent subpixel regions in line along the gate lines and are connected to the second gate line of the pair of the split gate lines, are connected to the odd data lines of the plurality of the data lines.

18. The liquid crystal display as claimed in claim 13, wherein the pixel region defined by the first gate line of the split gate lines and corresponding one of the plurality of the data lines is left-shifted or right-shifted along the gate line against the pixel region defined by the second gate line and corresponding one of the split gate lines.

19. The liquid crystal display as claimed in claim 18, wherein the switching devices of the plurality of switching devices, which are connected to the first gate line, are connected to even data lines of the plurality of data lines and the switching devices of the plurality of switching devices, which are connected to the second gate line, are connected to odd data lines of the plurality of the data lines.

20. The liquid crystal display as claimed in claim 19, wherein the pair of R, G and B subdots which are disposed in line in adjacent subpixel regions along the gate lines and are connected to the first gate line of the pair of split gate lines, are connected to the even gate lines of the plurality of data lines and the pair of R, G and B subdots which are disposed in line in adjacent subpixel regions along the gate lines and are connected to the second gate line of the pair of the split gate lines, are connected to the odd gate lines of the plurality of the data lines.

21. A liquid crystal display, comprising:
a plurality of data lines being spaced from each other at a selected distance;
a plurality of gate lines being spaced from each other at a selected distance, the gate lines being crossed with the data lines, each of gate lines being split into a pair of split gate lines comprising a first gate line and a second gate line, where the same gate line driving signal is provided;
a plurality of pixel regions defined by the gate lines and the data lines, each of pixel regions being divided into a pair of subpixel regions by the pair of split gate lines;
a plurality of R, G and B dots, each of the R, G and B dots being comprised of a pair of subpixel regions which are disposed in the subpixel region respectively, different R, G and B subdots being disposed in the pair of pixel regions and the same R, G and B subdots being disposed in the adjacent subpixel regions, the pair of R, G and B subdots, which are disposed in adjacent subpixel regions in line along the gate lines and are connected to the first gate line of the pair of split gate lines, are connected to even gate lines of the plurality of data lines and the pair of R, G and B subdots, which are disposed in adjacent subpixel regions in line along the gate lines and are connected to the second gate line of the pair of the split gate lines, are connected to odd gate lines of the plurality of the data lines; and
a plurality of switching devices disposed in the pixel regions, of each pair of switching devices arranged at every dot, one is disposed at the first subpixel region to connect the first gate line and corresponding one of the plurality of data lines and another is disposed at the second subpixel region to connect the second gate line and corresponding one of the plurality of data lines.

22. The liquid crystal display as claimed in claim 21, wherein the R, G and B dots are arranged in the order of R, G and B dots in the first gate fine of the pair of the split gate lines and arranged in the order of B, R and G dots in the second gate line of the pair of the split gate lines.

23. A liquid crystal display, comprising:
a plurality of data lines being spaced from each other at a selected distance;
a plurality of gate lines being spaced from each other at a selected distance, the gate lines being crossed with the data lines, each of gate lines being split into a pair of split gate lines comprising a first gate line and a second gate line, where the same driving signal is provided to each split gate line;
a plurality of pixel regions defined by the gate lines and the data lines, each of pixel regions being divided into a pair of subpixel regions by the pair of split gate lines;
a plurality of R, G and B dots, each of R, G and B dots being comprised of a pair of subpixel regions which are disposed in the subpixel region respectively, different R, G and B subdots being disposed in the pair of pixel regions and in the adjacent subpixel regions, different R, G and B subdots being disposed along the gate line; and
a plurality of switching devices disposed in the pixel regions, each switching device comprising a pair of switching devices, and one each of the pair of switching devices being respectively connected to a corresponding gate line and a data line of a plurality of gate lines and data lines.

24. The liquid crystal display as claimed in claim 23, wherein each pair of R, G and B subdots are arranged in diagonal direction to the data line in the two adjacent subpixel regions.

25. The liquid crystal display as claimed in claim 24, wherein the R, G and B dots are arranged in the order of R, G and B subdots in the first gate line of the pair of the split gate lines and arranged in the order of B, R and G subdots in the second gate line of the pair of the split gate lines.

26. The liquid crystal display as claimed in claim 25, wherein of the pair of switching devices arranged at every dot, one is disposed to the first subpixel region to connect the first gate line and corresponding one of the plurality of data lines and another is disposed to the second subpixel region to connect the second gate line and corresponding one of the plurality of data lines.

27. The liquid crystal display as claimed in claim 26, wherein of the pair of switching devices of the plurality of switching devices which are arranged in the pair of the subpixel regions, respectively, the switching device arranged in the first subpixel region is connected to the first gate line of corresponding pair of the split gate line in the split gate line pairs and corresponding data line of the plurality of the data lines and the switching device arranged in the second subpixel region is connected to the first gate line of the next adjacent pair of the split gate lines and, the next adjacent data line.

28. The liquid crystal display as claimed in claim 27, wherein to the first gate line of the pair of split gate lines, the switching device arranged in the fist subpixel region of corresponding pixel region of the plurality of the pixel regions and the switching device arranged in the second subpixel region in the previous pixel region are connected.

29. A liquid crystal display, comprising:

a plurality of data lines being spaced from each other at a selected distance;

a plurality of gate lines being spaced from each other at a selected distance, the gate lines being crossed with the data lines, each of gate lines being split into a pair of split gate lines comprising a first gate line and a second gate line, where the same driving signal is provided to each split gate line;

a plurality of pixel regions defined by the gate lines and the data lines, each of pixel regions being divided into i pair of subpixel regions by the pair of split gate lines;

a plurality of R, G and B dots, each of R, G and B dots being comprised of a pair of subpixel regions which are disposed in the subpixel region respectively, different R, G and B subdots being disposed in the pair of pixel regions and in the adjacent subpixel regions, different R, G and B subdots being disposed along the gate line, each pair of R, G and B subdots are arranged in a diagonal direction to the data line in the two adjacent subpixel regions;

a plurality of switching devices disposed in the pixel regions, the switching devices arranged in the first subpixel regions line being connected to the first gate line of a corresponding gate line pair and a corresponding one of the plurality of data lines and the switching devices arranged in the second subpixel regions being connected to the fit gate line of the next adjacent gate line pair and the next adjacent data line; wherein the R, G and B dots are arranged in the order of R, G and B subdots in the first gate line of the pair of the split gate lines and arranged in the order of B, R and G subdots in the second gate line of the pair of the split gate lilies, and wherein to the first gate line of the pair of split gate lines, the switching device arranged in the first subpixel region of corresponding pixel region of the plurality of the pixel regions and the switching device arranged in e second subpixel region in the previous pixel region are connected.

* * * * *